US006925457B2

(12) United States Patent
Britton et al.

(10) Patent No.: US 6,925,457 B2
(45) Date of Patent: Aug. 2, 2005

(54) METHODS AND APPARATUS FOR QUERYING A RELATIONAL DATA STORE USING SCHEMA-LESS QUERIES

(75) Inventors: Colin P. Britton, Lexington, MA (US); Ashok Kumar, North Billerica, MA (US); David Bigwood, Lexington, MA (US); Anthony J. DeFusco, Woonsocket, RI (US); Howard Greenblatt, Wayland, MA (US)

(73) Assignee: Metatomix, Inc., Waltham, MA (US)

( * ) Notice: Subject to any disclaimer, the term of this patent is extended or adjusted under 35 U.S.C. 154(b) by 0 days.

(21) Appl. No.: 10/302,764

(22) Filed: Nov. 21, 2002

(65) Prior Publication Data

US 2003/0158841 A1 Aug. 21, 2003

Related U.S. Application Data

(63) Continuation-in-part of application No. 10/051,619, filed on Oct. 29, 2001, which is a continuation-in-part of application No. 09/917,264, filed on Jul. 27, 2001.
(60) Provisional application No. 60/332,053, filed on Nov. 21, 2001, and provisional application No. 60/332,219, filed on Nov. 21, 2001.

(51) Int. Cl.[7] ............................................. G06F 17/30
(52) U.S. Cl. ................... 707/1; 707/2; 707/4
(58) Field of Search .............................. 707/1–10, 500, 707/513, 104.1; 705/1

(56) References Cited

U.S. PATENT DOCUMENTS

| 5,822,780 A | 10/1998 | Schutzman ................ 711/165 |
| 5,907,837 A | 5/1999 | Ferrel et al. ................... 707/3 |
| 5,974,441 A | 10/1999 | Rogers et al. |

(Continued)

OTHER PUBLICATIONS

"Inkling: RDF Query Using SquishQL," downloaded from http://swordfish.rdfweb.org/rdfquery/ on Mar. 20, 2003, 2 pages.
"rdfDB Query Language," downloaded from http://www.guha.com/rdfdb/query.html on Mar. 20, 2003, 4 pages.
"RDQL—RDF Data Query Language," Hewlett–Packard Company, © 1994–2003, downloaded from http://www.hpl.hp.com/semweb/rdql.htm on Mar. 20, 2003, 3 pages.
Berniers–Lee et al. *RFC 2396: Uniform Resource Identifiers (URI): Generic Syntax* (Aug. 1998) http://www.cs.tut.fi/~jkorpela/rfc/2396/full.html, 23 pages, downloaded on Feb. 20, 2003.
Forgy, Charles L. "Rete: A Fast Algorithm for the Many Pattern/Many Object Pattern Match Problem," *Artificial Intelligence* vol. 19 (1982) pp. 17–37.

(Continued)

*Primary Examiner*—Charles Rones
*Assistant Examiner*—Neveen Abel-Jalil
(74) *Attorney, Agent, or Firm*—David J. Powsner; Nutter McClennen & Fish

(57) ABSTRACT

The invention provides, in one aspect, a method of searching an RDF triples data store of the type in which the triples are maintained in accord with a first storage schema. The method includes inputting a first query specifying RDF triples that are to be identified in the data store. That first query assumes either (i) that the triples are stored in a schema-less manner (i.e., with no storage schema) or (ii) that the triples are maintained in accord with a second storage schema that differs from the first. The method further includes generating, from the first query, a second query that specifies those same RDF triples, yet, that reflects the first storage schema. That second query can be applied to the RDF triples data store in order to identify and/or retrieve the desired data.

18 Claims, 5 Drawing Sheets

U.S. PATENT DOCUMENTS

| | | | |
|---|---|---|---|
| 6,122,632 | A | 9/2000 | Botts et al. |
| 6,137,797 | A | 10/2000 | Bass et al. |
| 6,144,997 | A | 11/2000 | Lamming et al. |
| 6,177,932 | B1 | 1/2001 | Galdes et al. |
| 6,240,417 | B1 | 5/2001 | Eastwick et al. |
| 6,243,713 | B1 | 6/2001 | Nelson et al. |
| 6,330,554 | B1 | 12/2001 | Altschuler et al. |
| 6,389,460 | B1 | 5/2002 | Stewart et al. |
| 2002/0049603 | A1 * | 4/2002 | Mehra et al. ............... 705/1 |
| 2002/0049788 | A1 * | 4/2002 | Lipkin et al. ............ 707/513 |
| 2002/0091678 | A1 | 7/2002 | Miller et al. |
| 2002/0178232 | A1 | 11/2002 | Ferguson |
| 2003/0050834 | A1 | 3/2003 | Caplan |
| 2003/0050929 | A1 | 3/2003 | Bookman et al. |
| 2003/0074369 | A1 | 4/2003 | Scheutze et al. |
| 2003/0109951 | A1 | 6/2003 | Hsiung et al. |

OTHER PUBLICATIONS

Melnik, Sergey, "Storing RDF in a relational database," http://www–db.stanford.edu/ ~melnik/rdf/db.html, 5 pages, downloaded on 20/20/2003.

Quinlan, J. R., "Induction of Decision Trees," *Machine Learning* vol. 1 (1986) pp. 18–106.

*Resource Description Framework (RDF) Model and Syntax Specification* W3C Recommendation (Feb. 22, 1999) http://www.w3.org.TR/1999/REC–rdf–syntax–19990222/, 34 pages, downloaded on Feb. 20, 2003.

"The Rete Algorithm," http://herzberg.ca.sandia.gov/jess/docs/52/rete.html, 3 pages, downloaded on Feb. 20, 2003.

* cited by examiner

METHODS AND APPARATUS FOR QUERYING A RELATIONAL DATA STORE USING SCHEMA-LESS QUERIES

This application claims the benefit of priority of U.S. Provisional Patent Application Ser. No. 60/332,053, filed Nov. 21, 2001, entitled "Methods And Apparatus For Querying A Relational Database In A System For Real-Time Business Visibility" and U.S. Provisional Patent Application Ser. No. 60/332,219, filed on Nov. 21, 2001, entitled "Methods And Apparatus For Calculation and Reduction of Time-Series Metrics From Event Streams Or Legacy Databases In A System For Real-Time Business Visibility." This application is also a continuation-in-part of U.S. patent application Ser. No. 09/917,264, filed Jul. 27, 2001, entitled "Methods and Apparatus for Enterprise Application Integration" and U.S. patent application Ser. No. 10/051,619, filed Oct. 29, 2001, entitled "Methods And Apparatus For Real-Time Business Visibility Using Persistent Schema-Less Data Storage." The teachings of all of the foregoing applications are incorporated herein by reference.

BACKGROUND OF THE INVENTION

The invention pertains to digital data processing and, more particularly, to methods and apparatus for enterprise business visibility and insight using real-time reporting tools.

It is not uncommon for a single enterprise to have several separate database systems to track internal and external planning and transactional data. Such systems might have been developed at different times throughout the history of the enterprise and, therefore, represent differing generations of computer technology. For example, a marketing database system tracking customers may be ten years old, while an enterprise resource planning (ERP) system tracking inventory might be two or three years old. Integration between these systems is difficult at best, consuming specialized programming skill and constant maintenance expenses.

A major impediment to enterprise business visibility is the consolidation of data from these disparate legacy databases with one another and with that from newer e-commerce databases. For instance, inventory on-hand data gleaned from a legacy ERP system may be difficult to combine with customer order data gleaned from web servers that support e-commerce (and other web-based) transactions. This is not to mention difficulties, for example, in consolidating resource scheduling data from the ERP system with the forecasting data from the marketing database system.

An object of this invention is to provide improved methods and apparatus for digital data processing and, more particularly, for enterprise business visibility and insight (hereinafter, "enterprise business visibility").

A further object is to provide such methods and apparatus as can rapidly and accurately retrieve information responsive to user inquiries.

A further object of the invention is to provide such methods and apparatus as can be readily and inexpensively integrated with legacy, current and future database management systems.

A still further object of the invention is to provide such methods and apparatus as can be implemented incrementally or otherwise without interruption of enterprise operation.

Yet a still further object of the invention is to provide such methods and apparatus as to facilitate ready access to up-to-date enterprise data, regardless of its underlying source.

Yet still a further object of the invention is to provide such methods and apparatus as permit flexible presentation of enterprise data in an easily understood manner.

SUMMARY OF THE INVENTION

These and other objects are attained by the invention which provides, in one aspect, a method of searching an RDF triples data store of the type in which the triples are maintained in accord with a first storage schema. The method includes inputting a first query based, for example, on a user request, specifying RDF triples that are to be identified in the data store. That first query assumes either (i) that the triples are stored in a schema-less manner (i.e., with no storage schema) or (ii) that the triples are maintained in accord with a second storage schema that differs from the first. The method further includes generating, from the first query, a second query that specifies those same RDF triples, yet, that reflects the first storage schema. That second query can be applied to the RDF triples data store in order to identify and/or retrieve the desired data.

The invention provides, in further aspects, a method as described above including the steps of examining the first query for one or more tokens that represent data to be used in generating the second query. It also includes dispatching context-specific grammar events containing that data. A related aspect of the invention provides for dispatching events that represent any of declarations and constraints specified in the first query. A still further related aspect provides for dispatching declaration events specifying RDF documents from which triples are to be identified and constraint events specifying the triples themselves.

Further aspects of the invention provides methods as described above that include the steps of extracting statement data from the first query and associating that statement data with at least a portion of the second query. That second query can be generated, according to related aspects of the invention, in the form of an SQL SELECT statement. The associating step can include associating statement data from the first query with one or more clauses of the SELECT statement, to wit, the SELECT clause, the FROM clause, the WHERE clause and the ORDER-BY clause.

Still further aspects of the invention provide a method of translating a schema-less input query in a first language to an output query in a second language. As above, the method includes examining the schema-less input query for one or more tokens that represent data to be used in generating the output query; dispatching context-specific grammar events containing that data; and populating portions of the output query according to the events and data. The method further includes generating the output query in the second language comprising those populated portions, where the output query embodies a schema of a relational database storing RDF triples.

A related aspect of the invention provides methods as described above in which the dispatching step includes generating any of a logical condition event, a selection term declaration event, and a triple declarations event. A further related aspect of the invention includes generating a logical condition event containing data which, when applied to the relational database via the output query, identifies RDF triples according to a specified Boolean condition. A further related aspect of the invention includes generating an event containing data which, when applied to the relational database via the output query identifies RDF triples including a specified term. A still further related aspect of the invention includes generating an event containing data which, when applied to the relational database via the output query, identifies RDF triples having a specified subject predicate and/or object.

Related aspects of the invention provide methods as described above in which the first language is any of SQL-like and XML-like.

These and other aspects of the invention are evident in the drawings and in the description that follows.

BRIEF DESCRIPTION OF THE DRAWINGS

The foregoing features of this invention, as well as the invention itself, may be more fully understood from the following detailed description of the drawings in which.

DETAILED DESCRIPTION OF THE ILLUSTRATED EMBODIMENT

Figure 1:
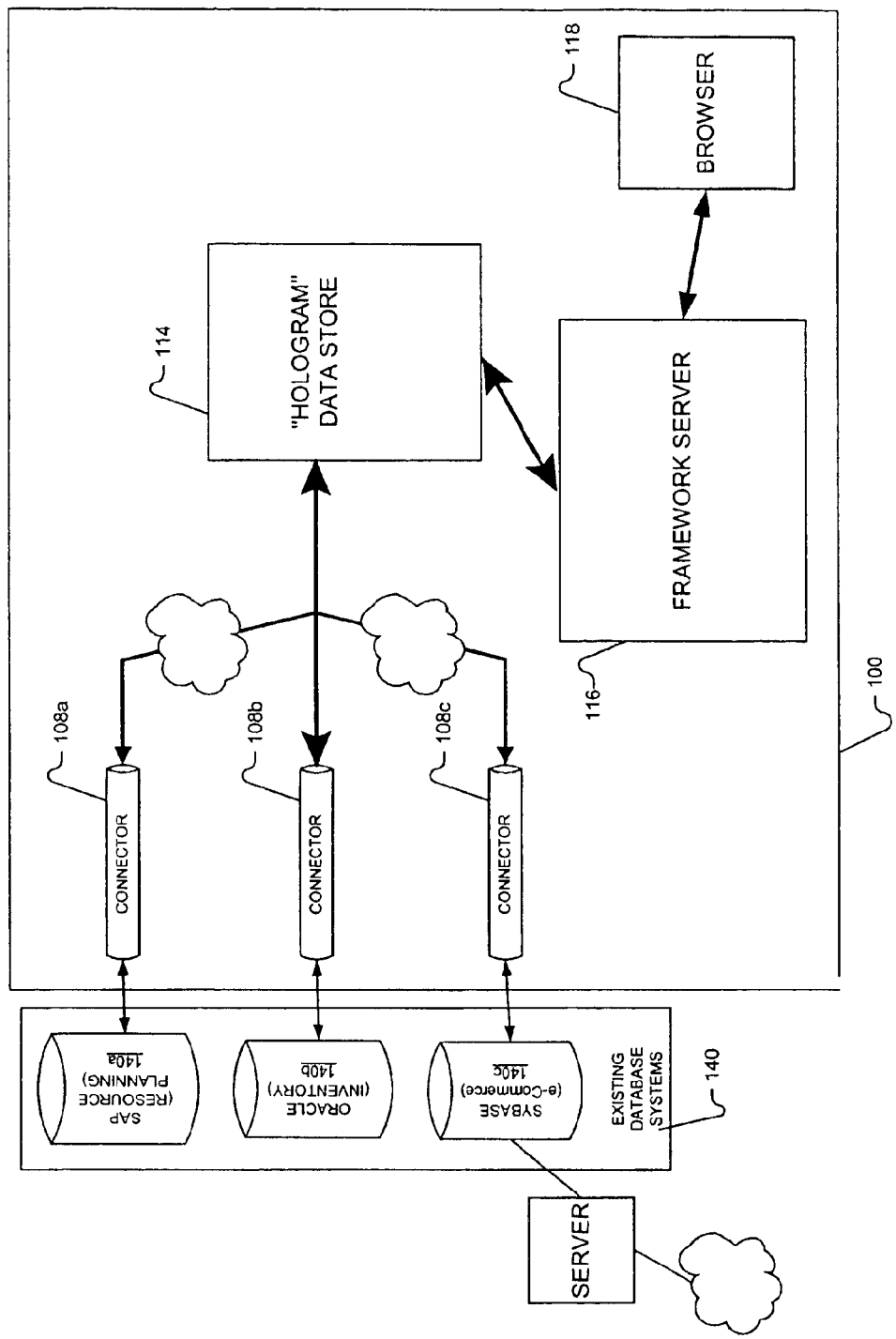
FIG. 1 depicts an improved enterprise business visibility and insight system according invention.

FIG. 1 depicts a real-time enterprise business visibility and insight system according to the invention. The illustrated system 100 includes connectors 108 that provide software interfaces to legacy, e-commerce and other databases 140 (hereinafter, collectively, "legacy databases"). A "hologram" database 114 (hereinafter, "data store" or "hologram data store"), which is coupled to the legacy databases 140 via the connectors 108, stores data from those databases 140. A framework server 116 accesses the data store 114, presenting selected data to (and permitting queries from) a user browser 118. The server 116 can also permit updates to data in the data store 114 and, thereby, in the legacy databases 140.

Legacy databases 140 represent existing (and future) databases and other sources of information (including data streams) in a company, organization or other entity (hereinafter "enterprise"). In the illustration, these include a retail e-commerce database (e.g., as indicated by the cloud and server icons adjacent database 140c) maintained with a Sybase® database management system, an inventory database maintained with an Oracle® database management system and an ERP database maintained with a SAP® Enterprise Resource Planning system. Of course, these are merely examples of the variety of databases or other sources of information with which methods and apparatus as described herein can be used. Common features of illustrated databases 140 are that they maintain information of interest to an enterprise and that they can be accessed via respective software application program interfaces (API) or other mechanisms known in the art.

Connectors 108 serve as an interface to legacy database systems 140. Each connector applies requests to, and receives information from, a respective legacy database, using that database's API or other interface mechanism. Thus, for example, connector 108a applies requests to legacy database 140a using the corresponding SAP API; connector 108b, to legacy database 140b using Oracle API; and connector 108c, to legacy database 140c using the corresponding Sybase API.

In the illustrated embodiment, these requests are for purposes of accessing data stored in the respective databases 140. The requests can be simple queries, such as SQL queries and the like (e.g., depending on the type of the underlying database and its API) or more complex sets of queries, such as those commonly used in data mining. For example, one or more of the connectors can use decision trees, statistical techniques or other query and analysis mechanisms known in the art of data mining to extract information from the databases.

Specific queries and analysis methodologies can be specified by the hologram data store 114 or the framework server 116 for application by the connectors. Alternatively, the connectors themselves can construct specific queries and methodologies from more general queries received from the data store 114 or server 116. For example, request-specific items can be "plugged" into query templates thereby effecting greater speed and efficiency.

Regardless of their origin, the requests can be stored in the connectors 108 for application and/or reapplication to the respective legacy databases 108 to provide one-time or periodic data store updates. Connectors can use expiration date information to determine which of a plurality of similar data to return to the data store, or if dates are absent, the connectors can mark returned data as being of lower confidence levels.

Data and other information (collectively, "messages") generated by the databases 140 in response to the requests are routed by connectors to the hologram data store 114. That other information can include, for example, expiry or other adjectival data for use by the data store in caching, purging, updating and selecting data. The messages can be cached by the connectors 108, though, they are preferably immediately routed to the store 114.

The hologram data store 114 stores data from the legacy databases 140 (and from the framework server 116, as discussed below) as RDF triples. The data store 114 can be embodied on any digital data processing system or systems that are in communications coupling (e.g., as defined above) with the connectors 108 and the framework server 116. Typically, the data store 114 is embodied in a workstation or other high-end computing device with high capacity storage devices or arrays, though, this may not be required for any given implementation.

Though the hologram data store 114 may be contained on an optical storage device, this is not the sense in which the term "hologram" is used. Rather, it refers to its storage of data from multiple sources (e.g., the legacy databases 140) in a form which permits that data to be queried and coalesced from a variety of perspectives, depending on the needs of the user and the capabilities of the framework server 116.

To this end, a preferred data store 114 stores the data from the legacy databases 140 in subject-predicate-object form, e.g., RDF triples, though those of ordinary skill in the art will appreciate that other forms may be used as well, or instead. By way of background, RDF is a way of expressing the properties of items of data. Those items are referred to as subjects. Their properties are referred to as predicates. And, the values of those properties are referred to as objects. In RDF, an expression of a property of an item is referred to as a triple, a convenience reflecting that the expression contains three parts: subject, predicate and object.

Subjects, also referred to as resources, can be anything that is described by an RDF expression. A subject can be person, place or thing—though, typically, only an identifier of the subject is used in an actual RDF expression, not the person, place or thing itself. Examples of subjects might be "car," "Joe," "http://www.metatomix.com."

A predicate identifies a property of a subject. According to the RDF specification, this may be any "specific aspect, characteristic, attribute, or relation used to describe a resource." For the three exemplary subjects above, examples of predicates might be "make," "citizenship," "owner."

An object gives a "value" of a property. These might be "Ford," "United Kingdom," "Metatomix, Inc." for the subject and objects given in the prior paragraphs, forming the following RDF triples:

| Subject | Predicate | Object |
| --- | --- | --- |
| "car" | "make" | "Ford" |
| "Joe" | "citizenship" | "United Kingdom" |
| "http://metatomix.com" | "owner" | "Metatomix, Inc." |

Objects can be literals, i.e., strings that identify or name the corresponding property (predicate). They can also be resources. In the example above, rather than merely the string "Metatomix, Inc." further triples may be specified-presumably, ones identifying that company in the subject and giving details in predicates and objects.

A given subject may have multiple predicates, each predicate indexing an object. For example, a subject postal zip code might have an index to an object town and an index to an object state, either (or both) index being a predicate URI.

Listed below is a portion of a data set of the type with which the invention can be practiced. The listing contains RDF triples, here, expressed in extensible markup language (XML) syntax. Those skilled in the art will, of course, appreciate that RDF triples can be expressed in other syntaxes and that the teachings hereof are equally applicable to those syntaxes. Further, the listing shows only a sampling of the triples in a database 114, which typically would contain tens of thousands or more of such triples.

```
<rdf:RDF...xmlns="http://www.metatomix.com/postalCode/1.0#>
<rdf:Description rdf:about="postal://zip#02886">
    <town>Warwick</town>
    <state>RI</state>
    <country>USA</country>
    <zip>02886</zip>
<rdf:Description>
    <rdf:Description rdf:about="postal://zip#02901">
    <town>Providence</town>
    <state>RI</state>
    <country>USA</country>
    <zip>02901</zip>
</rdf:Description>
```

Subjects are indicated within the listing using a "rdf:about" statement. For example, the second line of the listing defines a subject as a resource named "postal://zip#02886." That subject has predicates and objects that follow the subject declaration.

One predicate, <town>, is associated with a value "Warwick". Another predicate, <state>, is associated with a value "RI". The same follows for the predicates <country> and <zip>, which are associated with values "USA" and "02886," respectively. Similarly, the listing shows properties for the subject "postal://zip#02901," namely, <town> "Providence," <state> "RI," <country> "US" and <zip> "02901."

In the listing, the subjects and predicates are expressed as uniform resource indicators (URIs), e.g., of the type defined in Berniers-Lee et al, *Uniform Resource Identifiers (URI): Generic Syntax* (RFC 2396) (August 1998), and can be said to be expressed in a form <scheme>://<path>#<fragment>. For the subjects given in the example, <scheme> is "postal," <path> is "zip," and <fragment> is, for example, "02886" and "02901."

The predicates, too, are expressed in the form <scheme>://<path>#<fragment>, as is evident to those in ordinary skill in the art. In accord with XML syntax, the predicates in lines two, et seq., of the listing must be interpreted as suffixes to the string provided in the namespace directive "xmlns=http://www.metatomix.com/postalCode/1.0#" in line one of the listing. This results in predicates that are formally expressed as: "http://www.metatomix.com/postalCode/1.0#town," "http://www.metatomix.com/postalCode/1.0#state," "http://www.metatomix.com/postalCode/1.0#country" and "http://www.metatomix.com/postalCode/1.0#zip."

Hence, the <scheme> for the predicates is "http" and <path> is "www.metatomix.com/postalCode/1.0." The <fragment> portions are <town>, <state>, <country> and <zip>, respectively. It is important to note that the listing is in some ways simplistic in that each of its objects is a literal value. Commonly, an object may itself be another subject, with its own objects and predicates. In such cases, a resource can be both a subject and an object, e.g., an object to all "upstream" resources and a subject to all "downstream" resources and properties. Such "branching" allows for complex relationships to be modeled within the RDF triple framework.

Figure 2:
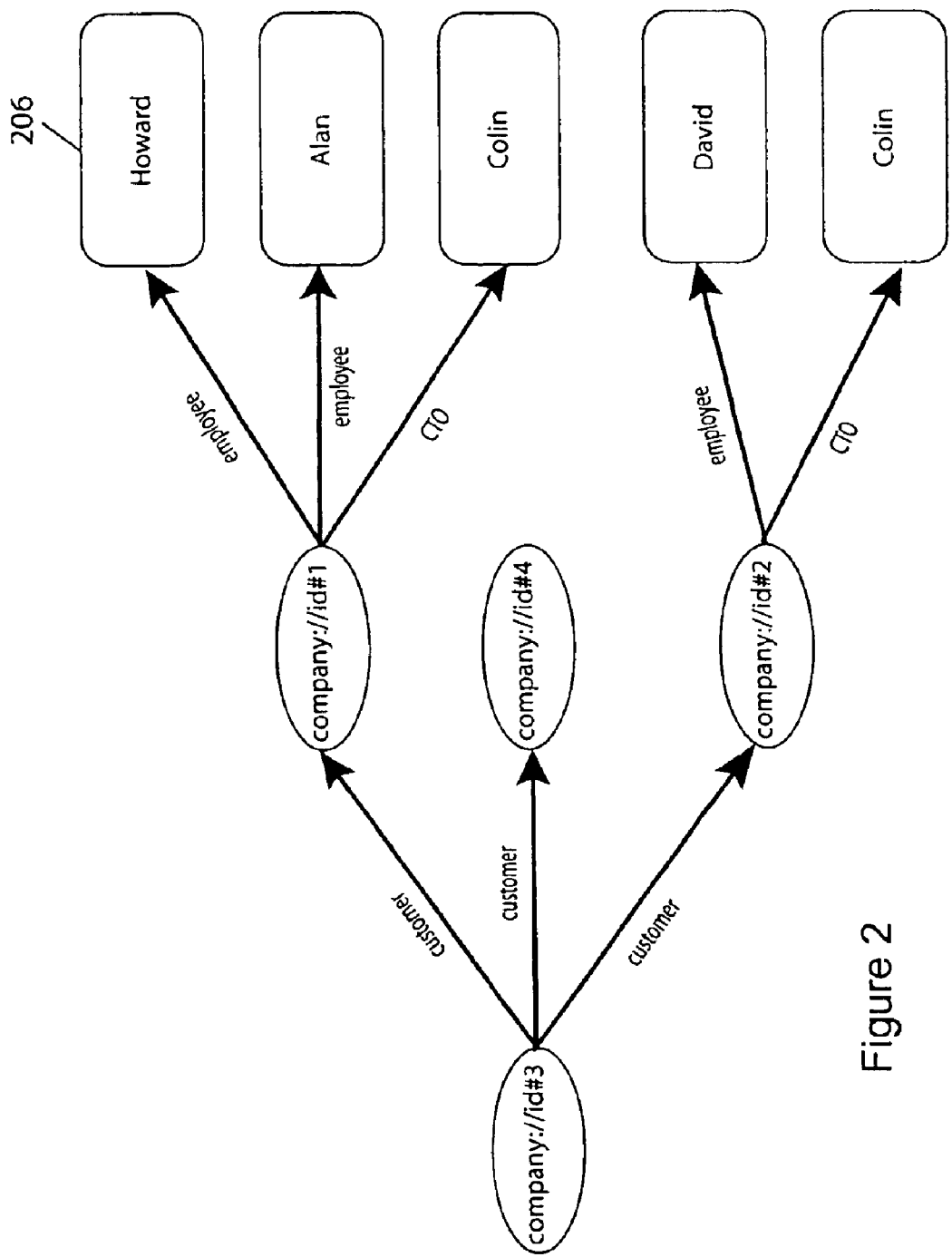
FIG. 2 depicts a directed graph representing data triples of the type maintained in a data store according to the invention.

FIG. 2 depicts a directed graph composed of RDF triples of the type stored by the illustrated data store 114, here, by way of non-limiting example, triples representing relationships among four companies (id#1, id#2, id#3 and id#4) and between two of those companies (id#1 and id#2) and their employees. Per convention, subjects and resource-type objects are depicted as oval-shaped nodes; literal-type objects are depicted as rectangular nodes; and predicates are depicted as arcs connecting those nodes.

Figure 1A:
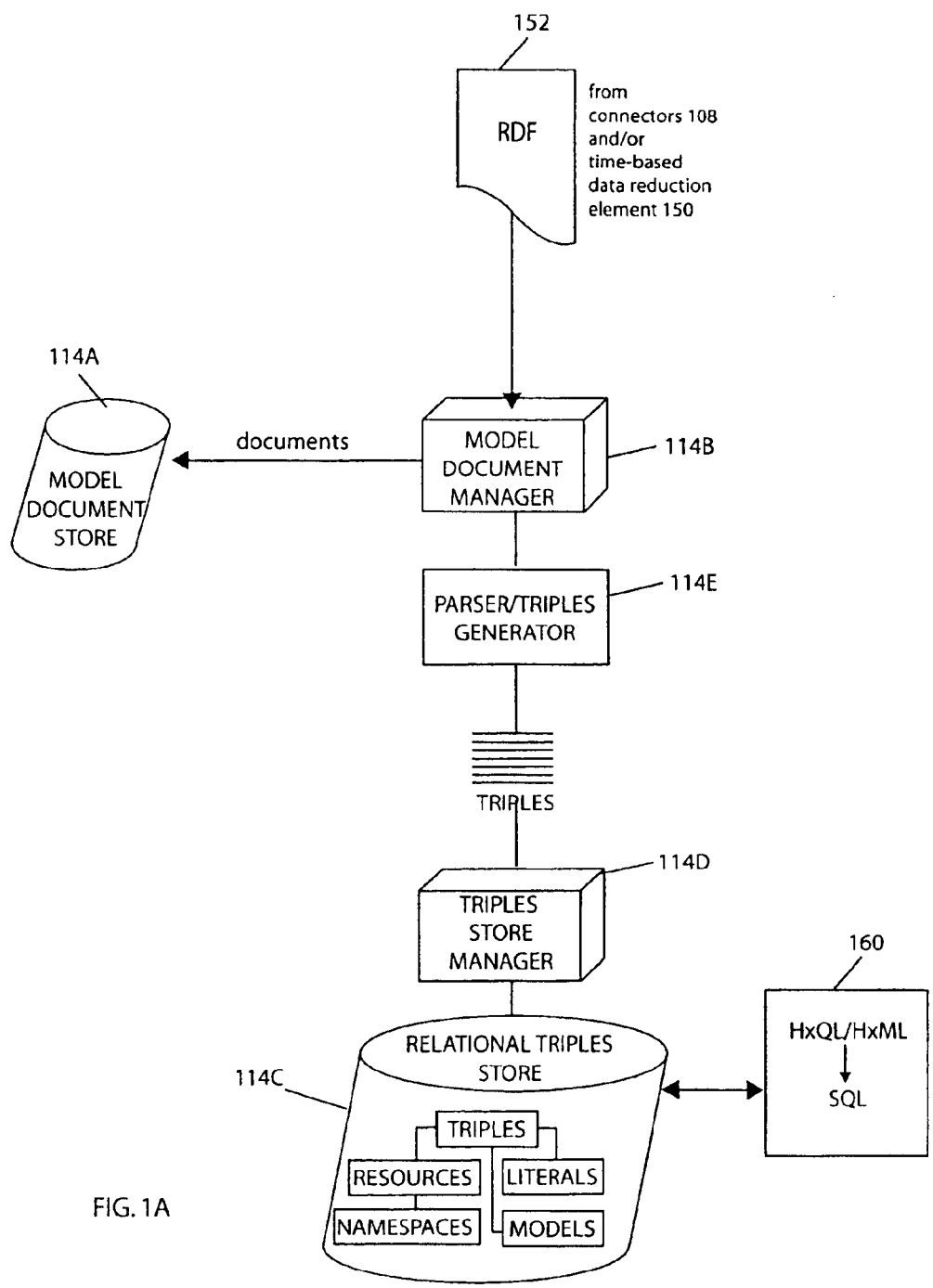
FIG. 1A depicts an architecture for a hologram data store according to the invention, e.g., in the system of claim 1.

FIG. 1A depicts an architecture for a preferred hologram data store 114 according to the invention. The illustrated store 114 includes a model document store 114A and a model document manager 114B. It also includes a relational triples store 114C, a relational triples store manager 114D, and a parser 114E interconnected as shown in the drawing.

As indicated in the drawing, RDF triples maintained by the store 114 are received—from the legacy databases 140 (via connectors 108) and/or from time-based data reduction module 150 (described below)—in the form of document objects, e.g., of the type generated from a Document Object Model (DOM) in a JAVA, C++ or other application. In the illustrated embodiment, these are stored in the model document store 114A as such (i.e., document objects) particularly, using the tables and inter-table relationships shown in FIG. 1B (see dashed box labelled 114B).

The model document manager 114B manages storage/retrieval of the document object to/from the model document store 114A. In the illustrated embodiment, the manager 114B comprises the Slide content management and integration framework, publicly available through the Apache Software Foundation. It stores (and retrieves) document objects to (and from) the store 114A in accord with the WebDAV protocol. Those skilled in the art will, of course, appreciate that other applications can be used in place of Slide and that document objects can be stored/retrieved from the store 114A in accord with other protocols, industry-standard, proprietary or otherwise.

However, use of the WebDAV protocol allows for adding, updating and deleting RDF document objects using a variety of WebDAV client tools (e.g., Microsoft Windows Explorer, Microsoft Office, XML Spy or other such tools available from a variety of vendors), in addition to adding, updating and deleting document objects via connectors 108 and/or time-based data reduction module 150. This also allows for presenting the user with a view of a traversable file system, with RDF documents that can be opened directly in XML editing tools or from Java programs supporting WebDAV protocols, or from processes on remote machines via any HTTP protocol on which WebDAV is based.

RDF triples received by the store 114 are also stored to a relational database, here, store 114C, that is managed and accessed by a conventional relational database management system (RDBMS) 114D operating in accord with the teachings hereof. In that database, the triples are divided into their constituent components (subject, predicate, and object), which are indexed and stored to respective tables in the manner of a "hashed with origin" approach. Whenever an RDF document is added, updated or deleted, a parser 114E extracts its triples and conveys them to the RDBMS 114D with a corresponding indicator that they are to be added, updated or deleted from the relational database. Such a parser 114E operates in the conventional manner known in the art for extracting triples from RDF documents.

Figure 1B:
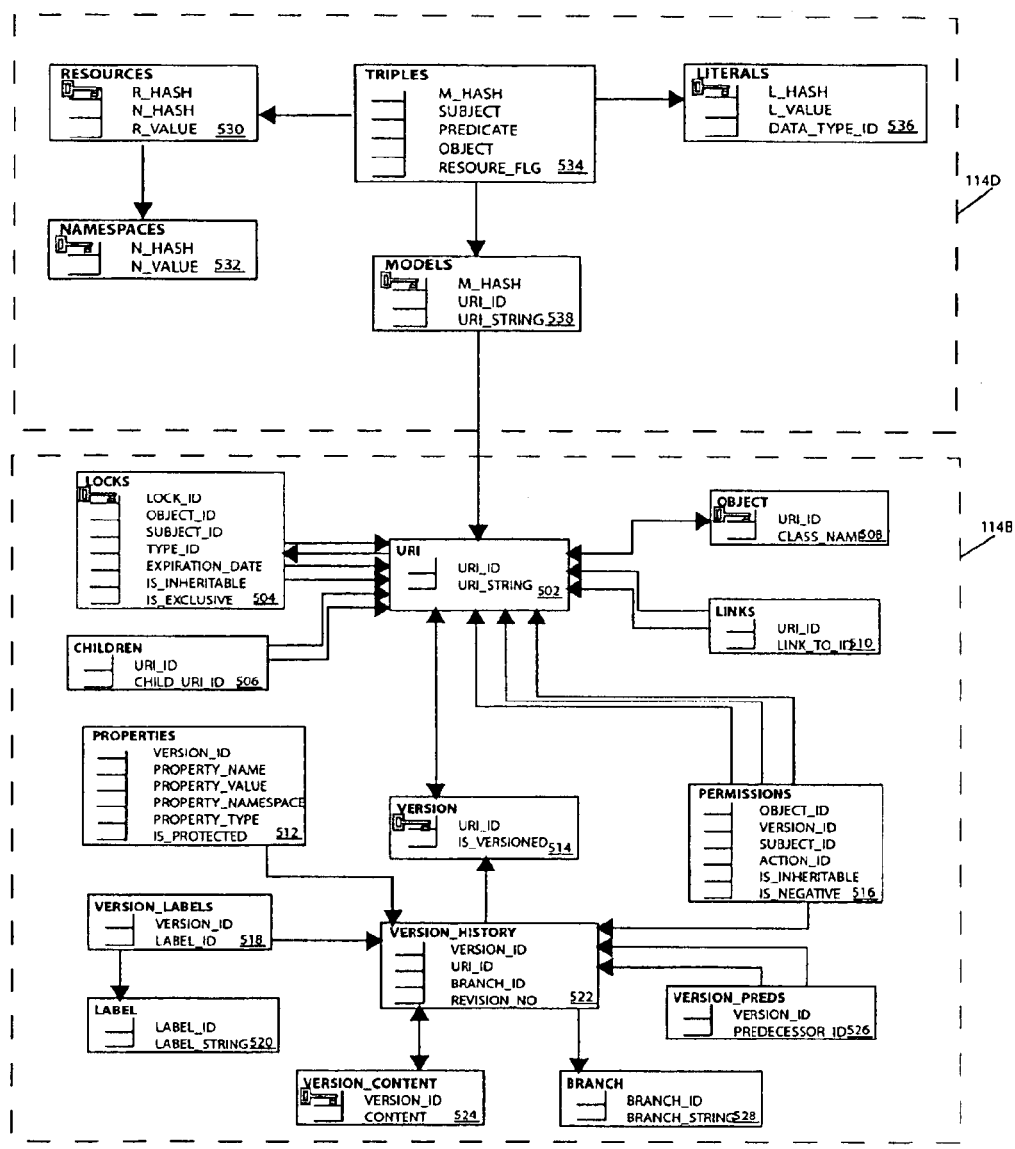
FIG. 1B depicts the tables in a model store and a triples store of the hologram data store of FIG. 1A.

The illustrated database store 114C has five tables inter-related as particularly shown in FIG. 1B (see dashed box labelled 114C). In general, these tables rely on indexes generated by hashing the triples' respective subjects, predicates and objects using a 64-bit hashing algorithm based on cyclical redundancy codes (CRCs)—though, it will be appreciated that the indexes can be generated by other techniques as well, industry-standard, proprietary or otherwise.

Referring to FIG. 1B, the "triples" table 534 maintains one record for each stored triple. Each record contains an aforementioned hash code for each of the subject, predicate and object that make up the respective triple, along with a resource flag ("resource_flg") indicating whether that object is of the resource or literal type. Each record also includes an aforementioned hash code ("m_hash") identifying the document object (stored in model document store 114A) from which the triple was parsed, e.g., by parser 114E.

In the illustrated embodiment, the values of the subjects, predicates and objects are not stored in the triples table. Rather, those values are stored in the resources table 530, namespaces table 532 and literals table 536. Particularly, the resources table 530, in conjunction with the namespaces table 532, stores the subjects, predicates and resource-type objects; whereas, the literals table 536 stores the literal-type objects.

The resources table 530 maintains one record for each unique subject, predicate or resource-type object. Each record contains the value of the resource, along with its aforementioned 64-bit hash. It is the latter on which the table is indexed. To conserve space, portions of those values common to multiple resources (e.g., common <scheme>://<path> identifiers) are stored in the namespaces table 532. Accordingly the field, "r_value," contained in each record of the resources table 530 reflects only the unique portion (e.g., <fragment> identifier) of each resource.

The namespaces table 532 maintains one record for each unique common portion referred to in the prior paragraph (hereinafter, "namespace"). Each record contains the value of that namespace, along with its aforementioned 64-bit hash. As above, it is the latter on which this table is indexed.

The literals table 536 maintains one record for each unique literal-type object. Each record contains the value of the object, along with its aforementioned 64-bit hash. Each record also includes an indicator of the type of that literal (e.g., integer, string, and so forth). Again, it is the latter on which this table is indexed.

The models table 538 maintains one record for each RDF document object contained in the model document store 114A. Each record contains the URI of the corresponding document object ("uri_string"), along with its aforementioned 64-bit hash ("m_hash"). It is the latter on which this table is indexed. To facilitate associating document objects identified in the models table 538 with document objects maintained by the model document store 114A, each record of the models table 538 also contains the ID of the corresponding document object in the store 114A. That ID can be assigned by the model document manager 114B, or otherwise.

From the above, it can be appreciated that the relational triples store 114C is a schema-less structure for storing RDF triples. As suggested by Melnik, supra, triples maintained in that store can be reconstituted via an SQL query. For example, to reconstitute the RDF triple having a subject equal to "postal://zip#02886", a predicate equal to "http://www.metatomix.com/postalCode/1.0#town", and an object equal to "Warwick", the following SQL statement is applied:

SELECT m.uri_string, t.resource_flg, concat (n1.n_value, r1.r_value) as subj, concat (n2.n_value, r2.r_value) as pred, concat (n3.n_value,r3.r_value), l.l_value FROM triples t, models m, resources r1, resources r2, namespaces n1, namespaces n2

LEFT JOIN literals l on t.object=l.l_hash

LEFT JOIN resources r3 on t.object=r3.r_hash

LEFT JOIN namespaces n3 on r3.r_value=n3.n_value

WHERE t.subject=r1.r_hash AND r1.n_hash=n1.n_hash AND t.predicate=r2.r_hash AND r2.n_hash=n2.n_hash AND m.uri_id=t.m_hash AND t.subject=hash("postal://zip#02886") AND t.predicate=hash('http://www.metatomix.com/postalcode/1.0#town') AND t.object=hash('warwick')

Those skilled in the art will, of course, appreciate that RDF documents and, more generally, objects maintained in the store 114 can be contained in other stores—structured relationally, hierarchically or otherwise—as well, in addition to or instead of stores 114A and 114C.

Figure 3:
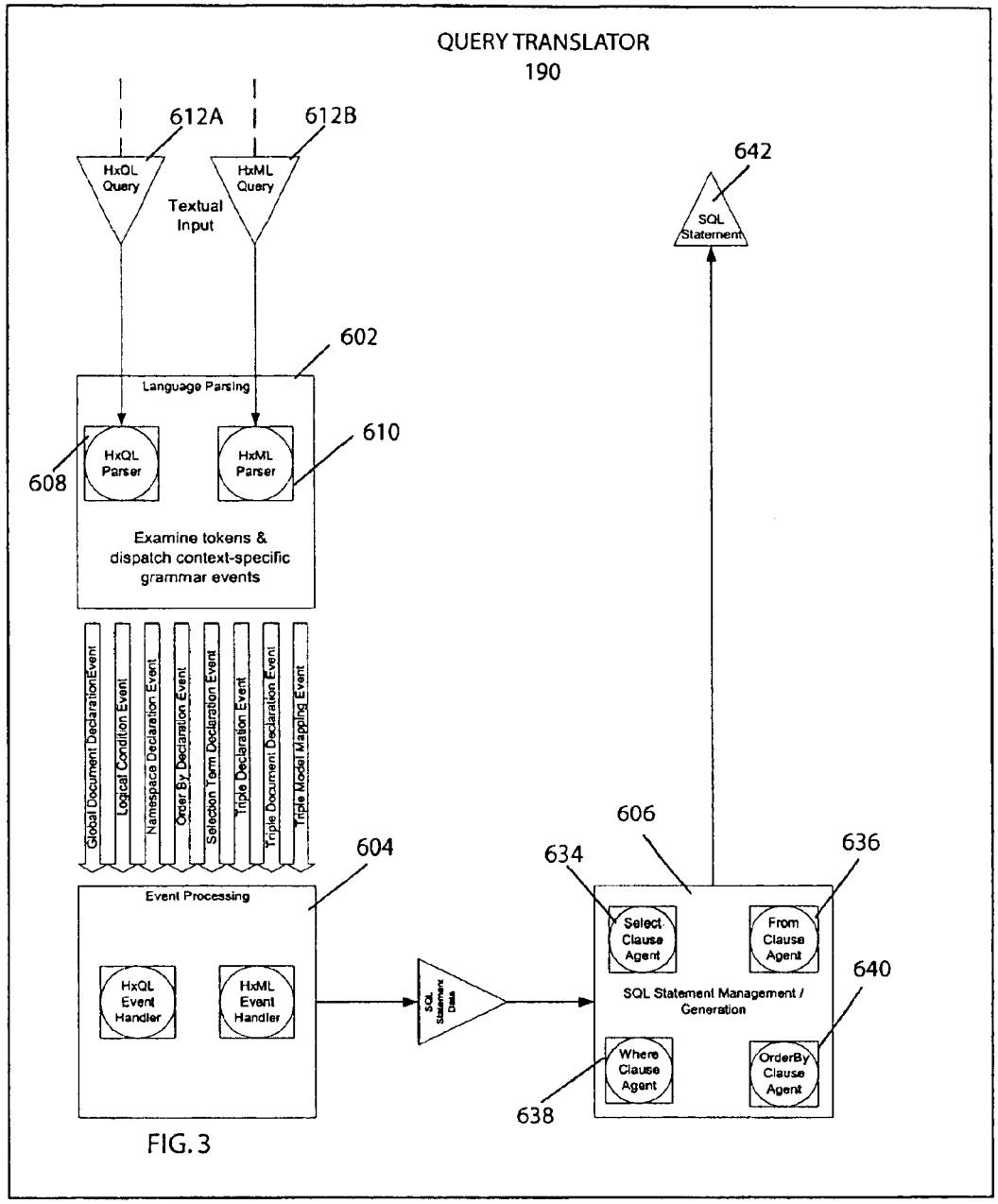
FIG. 3 is a functional block diagram of a query translator module in a system according to the invention.

Referring to FIGS. 1A and 3, the relational triples store manager 114D supports SQL queries such as the one exemplified above (for extracting a triple with the subject "postal://zip#02886", the predicate "http://www.metatomix.com/postalCode/1.0#town", and the object "Warwick"). As evident in the example, such SQL queries must take into account the underlying storage schema of the relational database (here, hashed by origin). To remove that as a constraint on queries, e.g., made by a user and applied via the framework 116, or otherwise, a query translator 190 translates schema-less queries 612 into schema-based SQL queries 642 for application to the relational store 114C. In the illustrated embodiment, the schema-less queries are expressed in an SQL-like language (here, identified as "HxQL") or in an XML-like language (here, identified as "HxML"), however, it will be appreciated that any language or means for expressing a query, schema-less or otherwise, may be used instead or in addition.

The illustrated query translator 190 has a language-parsing component 602, an event-processing component 604, and an SQL statement management/generation component 606. The language-parsing component 602 examines the input query 612 for tokens that represent data to be used in generating the SQL statement 642 and dispatches context-specific grammar events containing that data to the event processor. The event processor receives these and retrieves the data stored within them for use by statement management/generation component 606 to generate the SQL SELECT statement 642.

In the illustrated embodiment, the language-parsing component 602 has two parsing elements, each directed to one of two languages in which schema-less queries 612 can be expressed. The HxQL parser 608 parses queries expressed in the HxQL language, while the HxML parser 610 parses queries expressed in the HxML. HxQL grammar is based on R. V. Guha's RDFDB query language, Libby Miller's SquishQL and Andy Seaborne's RDQL. The HxQL parser 608 is implemented using JavaCC, a commercially available parser developed jointly by Sun Microsystems and Metamata. HxML comprises a grammar based on XML. The HxML parser 610 is implemented using an XML parser, such as Xerces available from Apache. It will be appreciated that in other embodiments, the language-parsing component 602 can have more, or fewer, parsing elements, and that those elements can be used to parse other languages in which the input query may be expressed.

The illustrated language-parsing component 602 can dispatch eight events. For example, a global document declaration event is dispatched indicating that a RDF document specified by a URI is included in the optional set of default document models to query. A logical condition event is dispatched when a constraint is parsed limiting triple data that is to be considered for retrieval. A namespace declaration event is dispatched when a mapping has been declared between an alias id and a URI fragment. An order by declaration event is dispatched when a record sorting order is specified with regard to columns of data representing terms selected for retrieval. A selection term declaration event is dispatched when a term is selected for retrieval. A triple declaration event is dispatched when a criterion for triple consideration is declared. A triple document declaration event is dispatched when at least one URI for an RDF document is declared to replace the set of default document models to query against but for a single particular triple criterion. And finally, a triple model-mapping event is dispatched when the set of default document models to query against for an individual triple criterion will be shared with a different individual triple criterion. It will be appreciated that more, or less, that these events are only examples of ones that can be dispatched, and in one embodiment, more (or less) events are appropriate depending on the schema of the database to be searched.

The event-processing component 604 listens for context-specific grammar events and extracts the data stored within them to populate the statement managment/generator component 606 with the data it needs for generating the SQL SELECT statement 642. For example, a Boolean constraint represented in a logical condition event is extracted and dispatched to the statement management/generation component 606 for inclusion in a SELECT WHERE clause of a SQL SELECT statement.

The statement management/generation component 606 stores and manages statement data and maps it directly to the relational triples store 114C schema. It uses that mapped data to generate an output query 642 corresponding to the input query 612. The statement manager 606 delegates the generation of the SQL SELECT statement to agent objects 634–640. Each agent generates a particular clause of the SELECT statement, e.g., the SELECT, FROM, WHERE and ORDER-BY clauses. In other embodiments, the statement manager can generate queries according to a different database storage schema and can output queries conforming to other languages.

In the illustrated embodiment, a select clause agent 634 generates the SELECT clause by mapping each term to the appropriate table and/or field name corresponding to tables/field names in triples data store 114C. A from clause agent 636 generates the FROM clause and ensures that table instances and their alias abbreviations are declared for use in other clauses. A where clause agent 638 generates the WHERE clause and ensures that all necessary table JOINS and filtering constraints are specified. Lastly, an order-by clause agent 640 generates an optional ORDER-BY clause thus specifying an order of the output results. In one embodiment, the agent objects distribute SQL generation between custom fragment managers and uses differing agents in accord with the database to be searched. Hence, it can be appreciated that the above agents are exemplary of a query translator 600 directed to generating queries for a relational triple store 114C, and in other embodiment, agents will be in accord with the data store of that embodiment. Each agent can also gather data from other agents as necessary, for example, alias information stored in a SELECT clause can be used to formulate constraints in the WHERE clause. Hence, the agents work in tandem until all statement data is properly "mapped" according to the schema of the triples store 114C.

It will be appreciated by those skilled in the art that the query translator 600 can be encapsulated and composited into other software components. It will also be appreciated that although the query translator 160 is directed toward an RDF triples store utilizing the hash with origin schema, it can generate output for use with triples (or other) stores utilizing other database vendors. For example, the query translator 160 can be implemented to output various SQL dialects, e.g., Microsoft SQL, which uses 0 and 1 for Boolean values versus the conventional TRUE/FALSE keywords. Further, configurable options such as generating SQL with or without computed hash codes in join criteria can be accommodated, as well.

Illustrated below is an example of use of the query translator 160 to generate an output SQL query 642 for application against a relational store 114C containing triples (organized in the aforementioned hashed with origin schema) from the RDF document:

```
<?xml version="1.0" encoding="UTF-8" ?>
<rdf:RDF xmlns:rdf="http://www.w3.org/1999/02/22-rdf-syntax-ns#"
xmlns:mtx="http://metatomix.com/blood/1.0#">
    <rdf:Description rdf:about="bloodtype://id#001">
        <mtx:group>O</mtx:group>
        <mtx:rh_status>+</mtx:rh_status>
    </rdf:Description>
    <rdf:Description rdf:about"bloodtype://id#002">
        <mtx:group>O</mtx:group>
        <mtx:rh_status>-</mtx:rh_status>
    </rdf:Description>
    <rdf:Description rdf:about="bloodtype://id#003">
        <mtx:group>A</mtx:group>
        <mtx:rh_status>+</mtx:rh_status>
```

-continued

```
</rdf:Description>
<rdf:Description rdf:about="bloodtype://id#004">
    <mtx:group>A</mtx:group>
    <mtx:rh_status>-</mtx:rh_status>
</rdf:Description>
<rdf:Description rdf:about="bloodtype://id#005">
    <mtx:group>B</mtx:group>
    <mtx:rh_status>+</mtx:rh_status>
</rdf:Description>
<rdf:Description rdf:about="bloodtype://id#006">
    <mtx:group>B</mtx:group>
    <mtx:rh_status>-</mtx:rh_status>
</rdf:Description>
<rdf:Description rdf:about="bloodtype://id#007">
    <mtx:group>AB</mtx:group>
    <mtx:rh_status>+</mtx:rh_status>
</rdf:Description>
<rdf:Description rdf:about="bloodtype://id#008">
    <mtx:group>AB</mtx:group>
    <mtx:rh_status>-<mtx:rh_status>
</rdf:Description>
</rdf:RDF>
```

A schema-less query 612, here expressed in the HxQL language, for returning all blood types stored in the triples store 114C is as follows:

```
/*
* Display all the different blood types (e.g. AB-)
*/
USING mtx FOR <http://metatomix.com/blood/1.0#>
SELECT ?blood_group, ?blood_rh
FROM <*/blood_*.rdf>
WHERE      (<mtx:group>, ?blood_type, ?blood_group),
           (<mtx:rh_status>, ?blood_type, ?blood_rh)
           AND ?blood_type = <bloodtype://id#*>
An equivalent query expressed in the HxML language is as follows:
<?xml version="1.0"?>
<a:hml xmlns:a="http://www.metatomix.com/hml#">
<!-- Display all the different blood types (e.g. AB-) -->
    <a:NamespaceAliasSet>
        <a:namespace a:uri="http://metatomix.com/blood/1.0#"
        a:alias="mtx"/>
    <a:/NamespaceAliasSet>
    <a:DefaultDocumentSet>
        <a:document a:uri="*/blood_*.rdf"/>
    <a:DefaultDocumentSet>
    <a:SelectionSet>
        <a:variable a:id="?blood_group"/>
        <a:variable a:id="?blood_rh"/>
    <a:/SelectionSet>
    <a:TriplesSet>
        <a:triple a:id="1" a:predicate="mtx:group"
        a:subject="?blood_type">
            <a:object a:type="literal">?blood_group</a:object>
        <a/:triple>
        <a:triple a:id="2" a:predicate="mtx:rh_status"
        a:subject="?blood_type">
            <a:object a:type="literal">?blood_rh</a:object>
        </a:triple>
    </a:TriplesSet>
    <a:ConstraintSet>
        <a:constraint a:isAnd="true" a:target="?blood_type"
        <a:operator="EQ" a:isNegated="false">
            <a:operand a:type="resource">bloodtype://id#*</a:operand>
        </a:constraint>
    </a:ConstraintSet>
</a:hml>
```

Operation of the query translator 160 results in generation of the following SQL SELECT statement for application against the relational data store 114C:

SELECT l0.1_value AS "BLOOD_GROUP", l1.1_value AS "BLOOD_RH"

FROM models m0, models m1, triples t0, triples t1, literals l0, literals l1, resources r2, resources r3, resources r4, namespaces n2, namespaces n3, namespaces n4

WHERE (t0.m_hash=m0.m_hash AND m0.uri_string LIKE '%/blood~_%. rdf' ESCAPE '~')

AND (t0.predicate=r2.r_hash AND r2.n_hash=n2.n_hash AND t0.predicate=8588294745283711900)

AND (t0.subject=r3.r_hash AND r3.n_hash=n3.n_hash)

AND (t0.object=l0.1_hash AND t0.resource_flg=0)

AND (t1.m_hash=m1.m_hash AND m1.uri_string LIKE '%/blood~_%.rdf' ESCAPE '~')

AND (t1.predicate=r4.r_hash AND r4.n_hash=n4.n_hash AND t1.predicate=8645869300922183732)

AND (t1.object=l1.1_hash AND t1.resource_flg=0)

AND (t1.subject=t0.subject)

AND (n3.n_value+r3.r_value) LIKE 'bloodtype://id#%' ESCAPE '~'

Application of this SELECT statement to the relational store 114C yields the following result set:

| BLOOD_GROUP | BLOOD_RH |
|---|---|
| B | − |
| A | + |
| O | + |
| A | − |
| AB | − |
| B | + |
| AB | + |
| O | − |

The data store 114 includes a graph generator (not shown) that uses RDF triples to generate directed graphs in response to queries (e.g., in HxQl or HxML form) from the framework server 116. These may be queries for information reflected by triples originating from data in one or more of the legacy databases 140 (one example might be a request for the residence cities of hotel guests who booked reservations on account over Independence Day weekend, as reflected by data from an e-Commerce database and an Accounts Receivable database). Such generation of directed graphs from triples can be accomplished in any conventional manner known the art (e.g., as appropriate to RDF triples or other manner in which the information is stored) or, preferably, in the manner described in co-pending, commonly assigned U.S. patent application Ser. No. 10/138,725, filed May 3, 2002, entitled METHODS AND APPARATUS FOR VISUALIZING RELATIONSHIPS AMONG TRIPLES OF RESOURCE DESCRIPTION FRAMEWORK (RDF) DATA SETS and Ser. No. 60/416,616, filed Oct. 7, 2002, entitled METHODS AND APPARATUS FOR IDENTIFYING RELATED NODES IN A DIRECTED GRAPH HAVING NAMED ARCS, the teachings of both of which are incorporated herein by reference. Directed graphs so generated are passed back to the server 116 for presentation to the user.

According to one practice of the invention, the data store 114 utilizes genetic, self-adapting, algorithms to traverse the RDF triples in response to queries from the framework server 116. Though not previously known in the art for this purpose, such techniques can be beneficially applied to the RDF database which, due to its inherently flexible (i.e., schema-less) structure, is not readily searched using traditional search techniques. To this end, the data store utilizes a genetic algorithm that performs several searches, each utilizing a different methodology but all based on the underlying query from the framework server, against the RDF triples. It compares the results of the searches quantitatively to discern which produce(s) the best results and reapplies that search with additional terms or further granularity.

Referring back to FIG. 1, the framework server 116 generates requests to the data store 114 (and/or indirectly to the legacy databases via connectors 108, as discussed above) and presents information therefrom to the user via browser 118. The requests can be based on HxQL or HxML requests entered directly by the user though, preferably, they are generated by the server 116 based on user selections/responses to questions, dialog boxes or other user-input controls. In a preferred embodiment, the framework server includes one or more user interface modules, plug-ins, or the like, each for generating queries of a particular nature. One such module, for example, generates queries pertaining to marketing information, another such module generates queries pertaining to financial information, and so forth.

In addition to generating queries, the framework server (and/or the aforementioned modules) "walks" directed graphs generated by the data store 114 to present to the user (via browser 118) any specific items of requested information. Such walking of the directed graphs can be accomplished via any conventional technique known in the art. Presentation of questions, dialog boxes or other user-input controls to the user and, likewise, presentation of responses thereto based on the directed graph can be accomplished via conventional server/browser or other user interface technology.

In some embodiments, the framework server 116 permits a user to update data stored in the data store 114 and, thereby, that stored in the legacy databases 140. To this end, changes made to data displayed by the browser 118 are transmitted by server 116 to data store 114. There, any triples implicated by the change are updated in store 114C, as are the corresponding RDF document objects in store 114A. An indication of these changes can be forwarded to the respective legacy databases 140, which utilize the corresponding API (or other interface mechanisms) to update their respective stores. (Likewise, changes made directly to the store 114C as discussed above, e.g., using a WebDAV client, can be forwarded to the respective legacy database.)

In some embodiments, the server 116 can present to the user not only data from the data store 114, but also data gleaned by the server directly from other sources. Thus, for example, the server 116 can directly query an enterprise web site for statistics regarding web page usage, or otherwise.

A further understanding of the operation of the framework server 116 may be attained by reference to the appendix filed with U.S. patent application Ser. No. 09/917,264, filed Jul. 27, 2001, and entitled "Methods and Apparatus for Enterprise Application Integration," which appendix is incorporated herein by reference.

Described herein are methods and apparatus meeting the above-mentioned objects. It will be appreciated that the illustrated embodiment is merely an example of the invention and that other embodiments, incorporating changes to those described herein, fall within the scope of the invention, of which we claim:

What is claimed is:

1. A method for searching an RDF triples data store having a first storage scheme, comprising:
   inputting a first query specifying one or more RDF triples to be identified in the data store, where the first query reflects any of a second storage schema or no storage schema, where such second storage scheme differs from the first storage schema,
   generating from the first query a second query that specifies one or more RDF triples to be identified in the data store responsive to the first query and that reflects the first storage schema,
   where the second query comprises
      a single SQL SELECT statement with a WHERE clause containing three or more logical conditions limiting triples to be considered for retrieval from the RDF triples data store, where each logical condition specifies one or more RDF triples according to a Boolean condition;
   applying the single SQL SELECT statement to the data store for identification of the one or more RDF triples responsive to the first query,
   where the RDF triples data store comprises
      a triples table that maintains one record for each stored triple,
      a resources table that maintains one record for each unique subject, predicate or resource-type object, and
      literals table that maintains one record for each unique literal-type object.

2. The method of claim 1, wherein each record of triples table comprises a hash code for each of the subject, predicate and object that make up the respective triple.

3. The method of claim 2, wherein each record of the triples tables comprises an indicator of whether the object of the respective triple is a resource type or literal type object.

4. The method of claim 2, wherein each record of triples table further comprises hash code identifying the document object with which the respective triple is associated.

5. The method of claim 1, wherein each record of the resources table comprises a value of the respective resource, along with its associate hash code, and wherein the resources table is indexed on that associated code.

6. The method of claim 1, wherein the RDF triples store further comprises a namespaces table that maintains one record for each unique portion of a subject, predicate or resource-type object that is common to multiple records in the resources table.

7. The method of claim 6, wherein each record of namespace table comprises a value of that namespace and its associated hash code, and wherein the namespace table is indexed on that associated hash code.

8. The method of claim 1, wherein each record of literals table comprises a value of the respective literal-type object, along with its associated hash code, and wherein the literals table is indexed on that associated hash code.

9. The method of claim 1, wherein the RDF data store further comprises a models table that maintains one record for each RDF document object from which the triples were parsed.

10. A method for translating a schema-less input query in a first language to an output query in a second language, comprising:
   examining the schema-less input query for one or more tokens that represent data to be used in generating the output query;
   dispatching context-specific grammar events containing that data;
   populating portions of the output query according to the events and data;
   generating the output query in the second language comprising those populated portions, wherein the output query represents a schema of a relational database storing RDF triples and wherein the output query comprises a single SQL SELECT statement with a WHERE clause containing three or more logical conditions limiting triples to be considered for retrieval from the RDF triples data store, where each logical condition specifies one or more RDF triples according to Boolean condition, where the relational database comprises
a triples table that maintains one record for each stored triple,
a resources table that maintains one record for each unique subject, predicate or resource-type object, and
literals table that maintains one record for each unique literal-type object.

11. The method of claim 10, wherein each record of triples table comprises a hash code for each of the subject, predicate and object that make up the respective triple.

12. The method of claim 11, wherein each record of the triples tables comprises an indicator of whether the object of the respective triple is a resource type or literal type object.

13. The method of claim 11, wherein each record of triples table further comprises hash code identifying the document object with which the respective triple is associated.

14. The method of claim 10, wherein each record of the resources table comprises a value of the respective resource, along with its associate hash code, and wherein the resources table is indexed on that associated code.

15. The method of claim 10, wherein the Relational database further comprises a namespaces table that maintains one record for each unique portion of a subject, predicate or resource-type object that is common to multiple records in the resources table.

16. The method of claim 15, wherein each record of namespaces table comprises a value of that namespace and its associated hash code, and wherein the namespace table is indexed on that associated hash code.

17. The method of claim 10, wherein each record of literals table comprises a value of the respective literal-type object, along with its associated hash code, and wherein the literals table is indexed on that associated hash code.

18. The method of claim 10, wherein the RDF data store further comprises a models table that maintains one record for each RDF document object from which the triples were parsed.

* * * * *